Nov. 19, 1940.　　　F. X. MARX　　　2,222,084
TELESCOPIC AMUSEMENT DEVICE
Filed Nov. 13, 1939
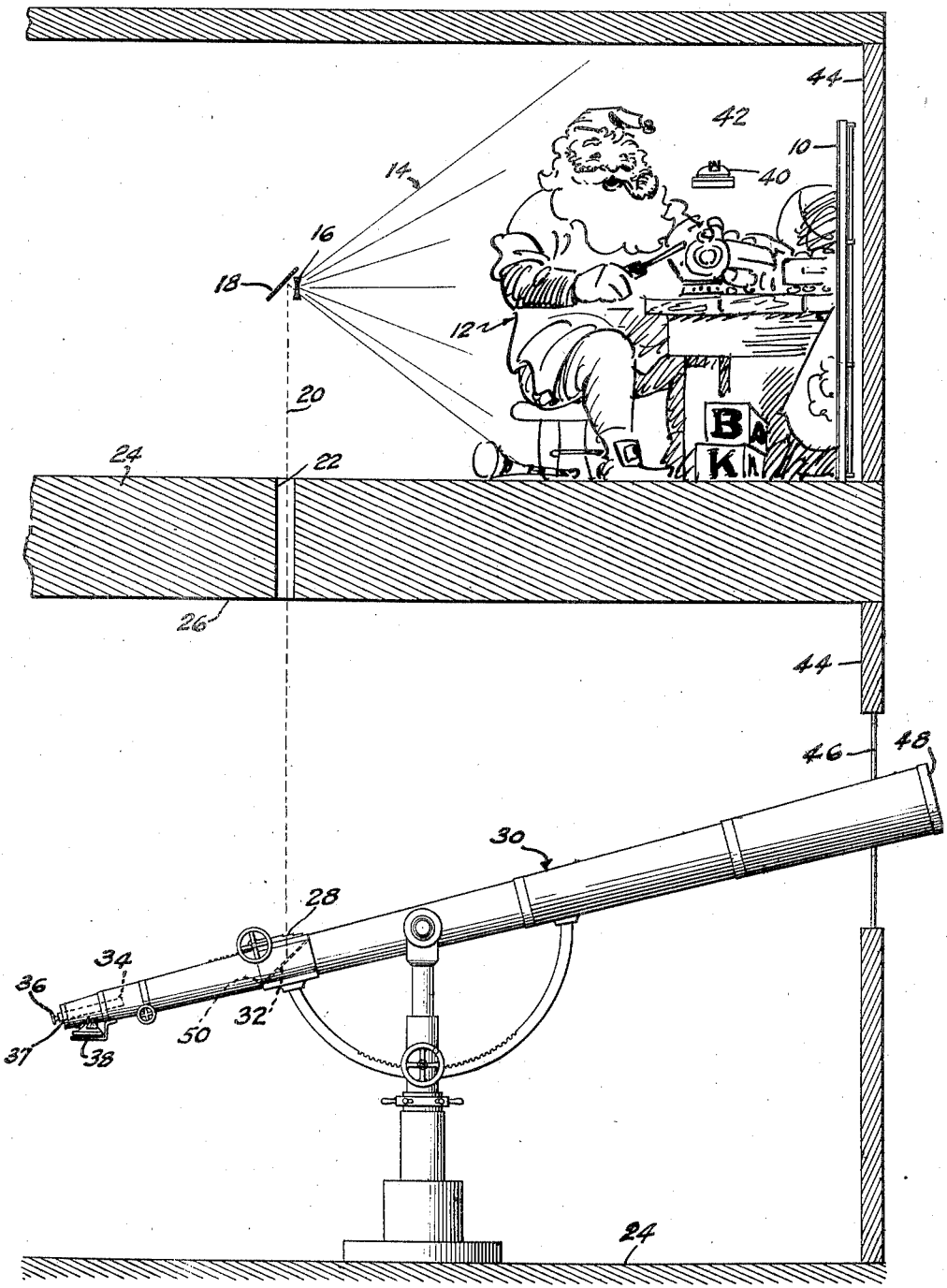
INVENTOR.
FRANK X. MARX
BY John B. Hoaty
ATTORNEY.

Patented Nov. 19, 1940

2,222,084

UNITED STATES PATENT OFFICE 2,222,084

TELESCOPIC AMUSEMENT DEVICE

Frank X. Marx, Madison, Wis., assignor to Harry S. Manchester, Inc., Madison, Wis., a corporation of Wisconsin Application November 13, 1939, Serial No. 304,074

1 Claim. (Cl. 272—13)

The object of my invention is the provision of a telescopic amusement device possessing what I shall term "magic powers," as the instrument is adapted to bring into the field of vision of the object glass, focus, and bring close to the eye of the observer, images apparently originating in such remote regions of space, that the distances from the terrestrial observer, must for convenience, be expressed in light years, light centuries, or other astronomical unit. And, in addition to viewing the images at close range, the observer may hold vocal communication with the objects.

Through the eyepiece of the telescope, fanciful characters, mythological creatures, pseudo-scientific races, such as Martians, and the like, can be viewed and spoken to at close range in animated form, and stage props forming portions of the scene, may, with technological propriety, comprise any special aspect of the heavens, such as clouds, stars, planets, comets, satellites, or other heavenly bodies.

It is, of course, obvious to all, except children of tender years, that the apparent distance from which the lens appears to have collected light to form the image of the distant object, must perforce be an illusion, but most adults and children are entertained and amused by the challenge to their intellectual faculties of advancing a satisfactory theory as to how the very obvious illusion is created.

In its general organization my invention comprises what appears to be a huge refracting telescope, with conventional mountings, but having in addition thereto a telephone. This large scope I shall term, "the magic telescope." A port or opening in a portion of the tube of the magic telescope houses a hinged mirror. In operative position this mirror is inclined 45 degrees from the horizontal, and the images mirrored by it, in a manner and for a purpose subsequently to be explained, may be brought to the desired power by a genuine telescope with achromatic-lens housed in the lower portion of the tube of the magic telescope, the eyepiece of the former being the one actually employed by the observer in viewing the scene. This eyepiece is preferably deep terrestrial, optically aligned with the telescope mirror above referred to, when the latter is inclined at an angle of 45 degrees from the horizontal.

The images are reflected from a companion mirror to the telescope mirror preferably through a camouflaged aperture in a wall or other structure, which may be either vertical or horizontal, so long as the incidence of the rays of light on the mirror is 45 degrees.

As the angle of incidence is equal to the angle of reflection, the companionate mirror is also inclined at an angle of 45 degrees from the horizontal, and positioned to reflect through the aperture. This latter mirror is positioned behind reducing lenses focused upon the acting space and associated props. It is, of course, obvious that whatever is to be reflected must be sufficiently luminous to permit the transmission of well defined images. Although equipped with plate glass in lieu of an object glass, the magic telescope, when the mirror is collapsed, may for all practical purposes be regarded as a dumb telescope, housing a comparatively small operable telescope, with achromatic-lens.

The figure in the drawing is a generally diagrammatic illustration showing Santa Claus in his workshop, with the huge scope and its associated parts operatively mounted on the floor beneath, the pseudo lens of the huge refractor being trained at the North Celestial Pole.

The reference character 10 indicates stage props of opaque blue celluloid or the like, having a rheostatically controlled source of light in the rear to illuminate the objects and simulate various aspects of the heavens. The reference character 12, indicates the Santa Claus workshop scene, with visual light waves 14 proceeding from all points on the scene to reducing lenses 16, where the image is reduced and projected on mirror 18, the latter being tilted at an angle of 45 degrees.

Mirror 18, reflects the rays downwardly as shown at 20, in a line perpendicular to the surface of the floor, and at right angles to aperture 22 cut vertically through floor 24, where the rays emerge from ceiling 26, proceeding downwardly through port 28 in the lower portion of scope 30, where they strike mirror 32, which is tilted at an angle of 45 degrees.

The reduced image striking mirror 32 is reflected to lens 34, is reverted and brought twenty times closer to the eye when viewed through terrestrial eyepiece 36, of 20-powered telescope 37, which is a real telescope. Reference character 38 indicates a telephone connected by concealed wiring (not shown) with telephone 40 in the acting space 42.

The reference character 44 indicates the north wall, where scope 30 projects through window 46, with plate glass closure 48 aimed at the North Celestial Pole. As indicated at 50, mirror 32 can be turned downwardly to give clear vision through tube 30, and glass closure 48.

It will be obvious from the foregoing that I have provided a telescopic amusement device that will both entertain and amuse, and that will appeal not only to the sense of sight, but also to the sense of hearing, as sights and sounds of all kind including vocal speech may apparently be transmitted from the infinite depths of space, the performers viewed through eyepiece 36, and the sounds transmitted through telephone 38.

To eliminate the possibility of a double image appearing in telescope 37, mirrors 18 and 32 are silvered on the face rather than on the back as is customary practice.

It will also be obvious that various modifications may be made without departing from the spirit and scope of my invention, and hence I do not wish to be limited in any particular, but rather what I claim as my invention is shown by the appended claim.

I claim:

In an apparatus for creating the illusion of seeing objects at a great distance, the combination of an observation room, a room adjacent to the observation room and containing objects, a wall between said rooms having an opening therein, an imitation telescope of comparatively large size located in the observation room, a telescope mounted in the end of said imitation telescope, an arrangement of mirrors and reducing lens positioned in said adjacent room and in said telescope so that the interior of said adjacent room may be visible in the telescope on a line of sight passing through the opening in the aforesaid wall.

FRANK X. MARX.